United States Patent [19]
He

[11] Patent Number: 6,085,207
[45] Date of Patent: *Jul. 4, 2000

[54] METHOD OF PERFORMING SIGNED OPERATIONS WITH UNSIGNED INSTRUCTIONS IN A MICROPROCESSOR

[75] Inventor: Liang He, Sunnyvale, Calif.

[73] Assignee: Sun Microsystems, Inc., Palo Alto, Calif.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/874,043

[22] Filed: Jun. 12, 1997

[51] Int. Cl.⁷ .................................................... G06F 7/38
[52] U.S. Cl. ......................... 708/204; 708/670; 708/490; 712/221
[58] Field of Search .................. 364/715.03, 736.01, 364/748.01, 748.11, 768; 341/50; 395/562, 563; 708/204, 670, 500, 570, 490; 712/221, 222

[56] References Cited

U.S. PATENT DOCUMENTS

| | | | |
|---|---|---|---|
| 4,935,890 | 6/1990 | Funyu | 708/204 |
| 5,745,125 | 4/1998 | Deering et al. | 345/503 |
| 5,801,975 | 9/1998 | Thayer et al. | 708/402 |
| 5,941,938 | 8/1999 | Thayer | 708/490 |

FOREIGN PATENT DOCUMENTS 489552  6/1992  European Pat. Off. .

OTHER PUBLICATIONS

Japanese Abstract No. 362224830; Ushinmei, Oct. 1987.

Japanese Abstract No. 405303498; Nakamura et al, Nov. 1993.

*Primary Examiner*—Kenneth R. Coulter
*Attorney, Agent, or Firm*—Fish & Richardson P.C.

[57] ABSTRACT

A method for controlling a microprocessor to transform data from a signed format to an unsigned format so that the data can be processed by unsigned instructions. In particular, a subtraction between two signed numbers can be transformed into a subtraction between two unsigned numbers.

5 Claims, 3 Drawing Sheets

METHOD OF PERFORMING SIGNED OPERATIONS WITH UNSIGNED INSTRUCTIONS IN A MICROPROCESSOR

FIELD OF THE INVENTION

The present invention relates to operations of a microprocessor. More particularly, the present disclosure describes an operation method for performing arithmetic instructions for signed and unsigned data.

BACKGROUND OF THE INVENTION

Operations of digital microprocessors are based on binary data. Binary data can be formed to represent signed data or unsigned data. Signed data can be used to represent both positive and negative numbers. Unsigned data can only represent positive numbers. Arithmetic instructions of a microprocessor process information in form of signed and unsigned digital data and control many operational processes of the microprocessor.

Many prior-art systems have separate operations for different kinds of information. For example, a system may use "signed" arithmetic instructions for some arithmetic operations which are operable only with signed numbers. Conversely, instructions for some arithmetic operations may be operable only for unsigned numbers and would thereby be referred to as "unsigned" arithmetic instructions.

For example, an instruction called "vis_pdist" in the Visual Instruction Set (VIS) of UltraSPARC processors controls a microprocessor to compute the sum of the absolute difference between a pair of eight-pixel unsigned binary bit sets. This is described in the "VIS User's Manual", release 1.0, from Sun Microsystems, April, 1996. One application of this instruction is to accelerate motion compensation to support real-time video compression. However, vis_pdist instruction usually can be used for unsigned data only. Its current implementation cannot be directly applied to signed data. Other examples of instructions which can only be applied to signed data are also known, such as the instructions fpsub16 and pfsub32 on UltraSPARC processors.

Such division between signed and unsigned operations is limiting in the operation efficiency of a microprocessor.

SUMMARY OF THE INVENTION

The inventor recognized that many applications require operations for both signed and unsigned data. In view of this recognition, the inventor has discovered techniques allowing implementing a signed arithmetic instruction on unsigned data.

The inventor has discovered additional techniques allowing implementing an unsigned instruction on signed data.

Therefore, the capabilities of a microprocessor are enhanced by controlling the microprocessor in a special way so that a signed arithmetic instruction can be used on unsigned data. The microprocessor is also controlled such that an unsigned instruction can be used on signed data.

One aspect of the present invention is an implementation of a data transforming mechanism in a microprocessor which renders the instructions thereof transparent to the type of data.

Another more specific aspect of the present invention is to expand the functionality of the Visual Instruction Set (VIS), thereby enhancing the performance of UltraSPARC processors.

A preferred microprocessor for performing signed and unsigned operations implements a data transformation mechanism that comprises:

using a data transformation to change a data representation of a first form for data that is originally in a second form, one of said first form and said second form representing a signed format and another representing an unsigned format;

transforming a second form operation of said data in said second form controlled by a second form instruction into a first form operation in said data representation of said first form; and using said microprocessor to perform an unsigned operation on an unsigned data with a signed instruction and a signed operation on a signed data with an unsigned instruction.

BRIEF DESCRIPTION OF THE DRAWINGS

These and other aspects and advantages of the present invention will become more apparent in light of the following detailed description of preferred embodiments thereof, as illustrated in the accompanying drawings, in which.

DESCRIPTION OF THE PREFERRED EMBODIMENTS

The present invention implements a mechanism in a microprocessor to transform an item of data between signed and unsigned formats so that the data can be processed by both signed and unsigned instructions. In particular, a mechanism of performing transformation between signed and unsigned formats for operations on subtraction is disclosed in the present disclosure. According to the invention, an operation between two signed integers can be transformed into another equivalent operation between two unsigned integers as needed. Conversely, an operation between two unsigned integers can be transformed into an equivalent operation of two signed integers. It is noted that the transformations do not change the end results of the operations.

Figure 1:
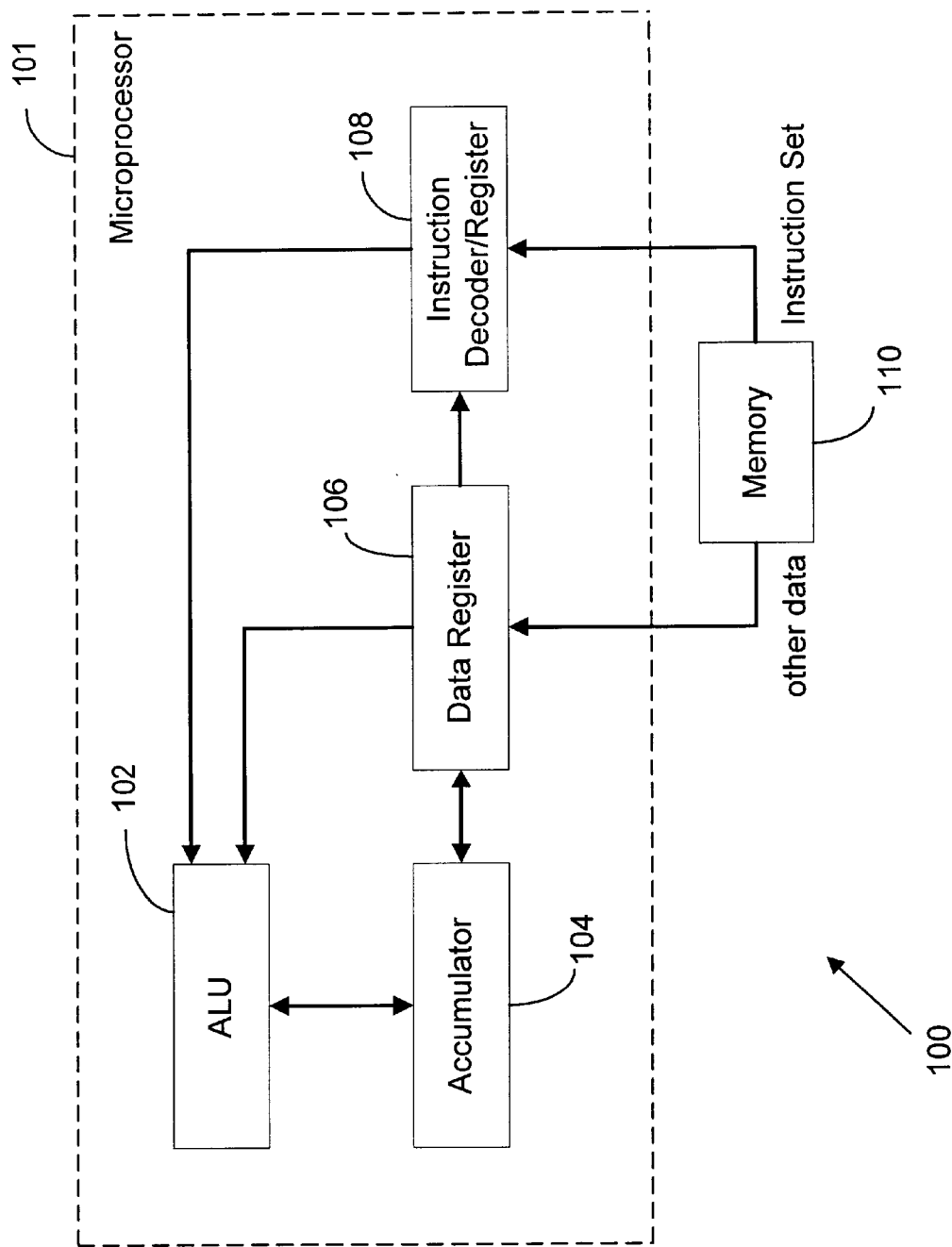
FIG. 1 is a block diagram showing an exemplary microprocessor.

FIG. 1 shows a preferred microprocessor 101 in accordance with the invention. An arithmetic logic unit (ALU) 102 performs arithmetic and logic operations including binary addition, subtraction, multiplication, division, and a number of logical comparisons. The instruction set for the microprocessor 101 controls, at least in part, the operations of ALU 102. The instruction set can be stored in a memory unit 110 which can be either an built-in memory in the microprocessor and/or an external memory. The data from the data register 106 may be transformed into a desired format (e.g., from signed to unsigned) prior to an execution of an operation by the ALU 102.

Unsigned integer data of N bits can be represented in the following binary form:

$$s \cdot 2^{N-1} + \text{frac}, (N=1, 2, 3, \ldots) \qquad (1)$$

where s is the value of the most significant bit of the data and frac is the value of the lower (N−1) bits, respectively. A signed integer data of N bits can be analogously expressed in another form as $$-s \cdot 2^{N-1} + \text{frac}, \quad (2)$$

where the negative sign "−" in front of s indicates that the integer is a signed operand.

1. Transforming Unsigned Operations for Signed Instructions

Subtraction c between two unsigned data a and b can be represented as follows:

$$a = s_1 \cdot 2^{N-1} + \text{frac1}, \quad (3)$$

$$b = s_2 \cdot 2^{N-1} + \text{frac2}, \quad (4)$$

then, $$c = a - b = (s_1 - s_2) \cdot 2^{N-1} + (\text{frac1} - \text{frac2}) \quad (5)$$

Equation (5) can be rewritten in the following form by using two signed integers m and n having values respectively corresponding to unsigned data a and b, where:

$$m = -s_2 \cdot 2^{N-1} + \text{frac1}, \quad (6)$$

$$n = -s_1 \cdot 2^{N-1} + \text{frac2}, \quad (7)$$

$$c = a - b \text{ (operable with unsigned instruction)} \quad (8)$$
$$= (s_1 - s_2) \cdot 2^{N-1} + (\text{frac1} - \text{frac2})$$
$$= [(-s_2) \cdot 2^{N-1} + \text{frac1}] - [-s_1 \cdot 2^{N-1} + \text{frac2}]$$
$$= m - n \text{ (operable with signed instruction).}$$

Note that the subtraction is carried out the same way with the same end results, but with different operands. Equation (8) states that an unsigned operation represented by Equation (5) can be transformed into a form that can be operated using signed instructions. The transformation includes using two signed integers m and n as new operands in a second data representation to replace the original operands in a first data representation, unsigned a and b.

Figure 2:
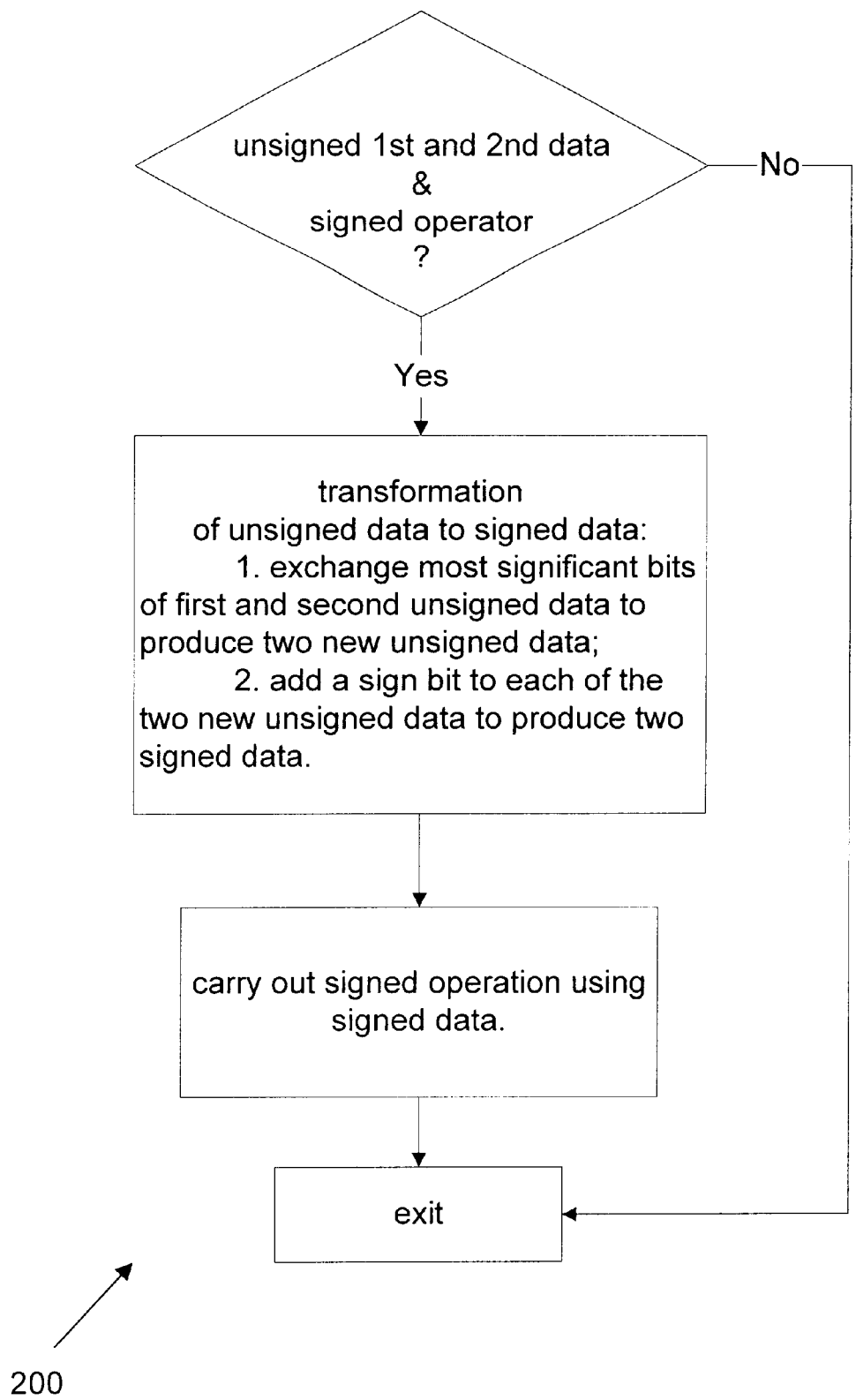
FIG. 2 is a flowchart of a preferred operation of transforming an unsigned operation between two unsigned integers to an equivalent operation between two signed integers using signed instructions.

FIG. 2 is a flowchart 200 to show the main steps of transforming an unsigned operation between two unsigned integers to an equivalent operation between two signed integers using signed instructions. The above example for subtraction is only a special case. In step one, unsigned operands are transformed to unsigned operands. For subtraction, the most significant bits of the two unsigned integers are exchanged and hence two new unsigned integers are produced. Next, the new unsigned integers are converted into two new signed integers by adding the bit information indicative of sign. In step two, signed instructions are used to perform an operation between the two new signed integers.

2. Transforming Signed Operations for Unsigned Instructions

Analogous transformation can be used to transform signed operations for unsigned instructions.

Subtraction z between two signed data x and y with the same bit pattern can be expressed as:

$$x = -s_1 \cdot 2^{N-1} + \text{frac1}, \quad (9)$$

$$y = -s_2 \cdot 2^{N-1} + \text{frac2}, \quad (10)$$

$$z = x - y \quad (11)$$
$$= (s_2 - s_1) \cdot 2^{N-1} + (\text{frac1} - \text{frac2}).$$

Exchanging the most significant bits of x and y in the following manner defines two unsigned integers p and q that can be used to replace x and y in Equation (11):

$$p = s_2 \cdot 2^{N-1} + \text{frac1}, \quad (12)$$

$$q = s_1 \cdot 2^{N-1} + \text{frac2}, \quad (13)$$

$$z = x - y \text{ (operable with signed instructions)} \quad (14)$$
$$= [s_2 \cdot 2^{N-1} + \text{frac1}] - [s_1 \cdot 2^{N-1} + \text{frac2}]$$
$$= p - q \text{ (operable with unsigned instructions).}$$

This exchange of the most significant bits allows a transformation from a first data representation, signed x and y, to a second data representation, unsigned p and q, as defined by Equations (12) and (13). Such a conversion hence enables the microprocessor to perform unsigned instructions on signed operations.

Figure 3:
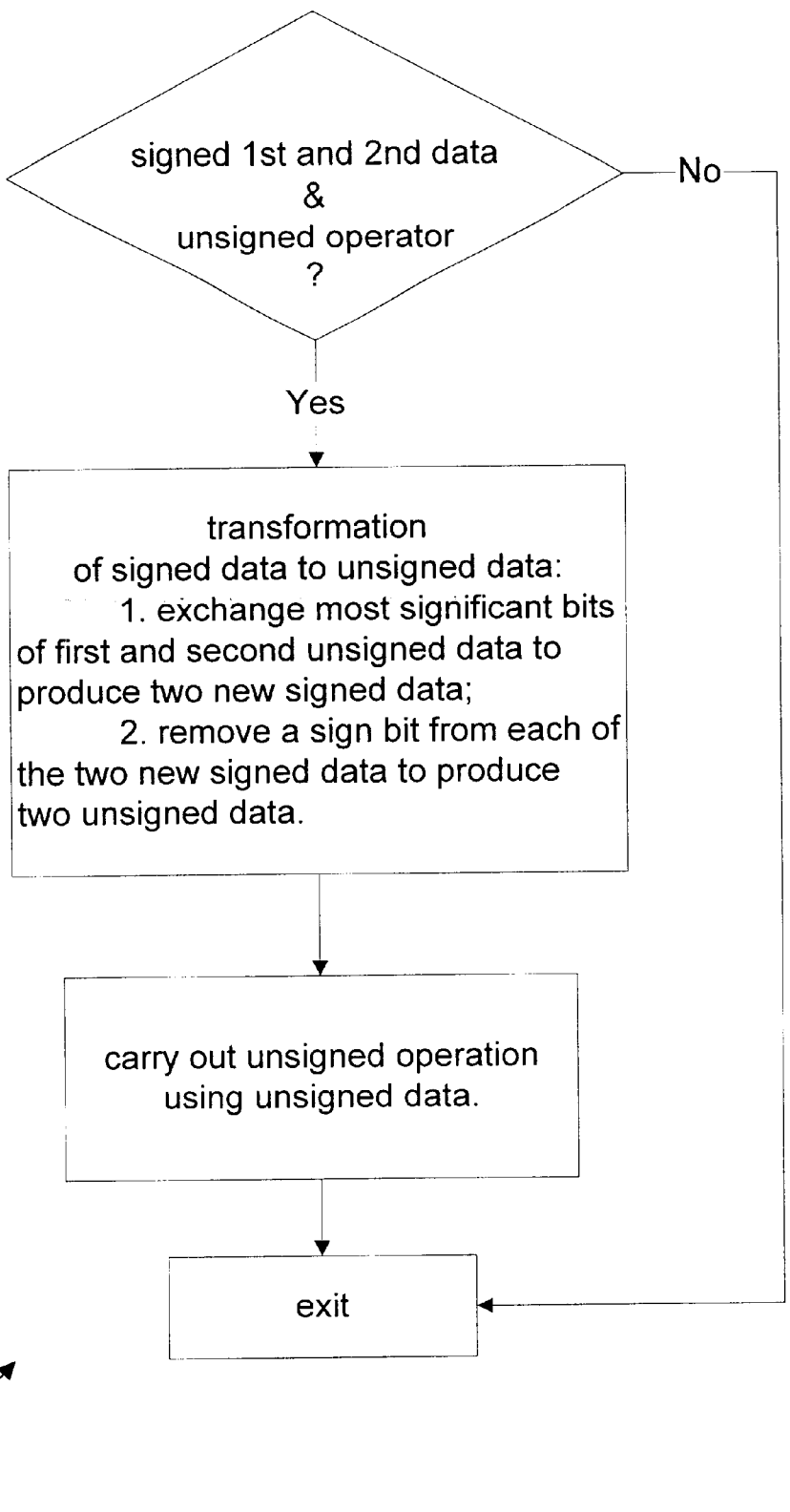
FIG. 3 is a flowchart of a preferred operation of transforming a signed operation between two signed integers to an equivalent operation between two unsigned integers using unsigned instructions.

FIG. 3 is a flowchart 300 to show the main steps of transformation of an operation between two signed integers to an equivalent operation between two unsigned integers, using unsigned instructions. The above example for subtraction is only a special case. In step one, signed operands are transformed to unsigned operands. For subtraction, the most significant bits of the two signed integers are exchanged and hence two new signed integers are produced. Next, the new signed integers are converted into two new unsigned integers by eliminating the bit information indicative of sign. In step two, unsigned instructions are used to perform an operation between the two new unsigned integers.

Although the present invention has been described in detail with reference to the preferred embodiment, one ordinarily skilled in the art to which this invention pertains will appreciate that various modifications and enhancements may be made without departing from the spirit and scope of the following claims.

What is claimed is:

1. A method of operating a data processor to perform signed and unsigned operations, comprising:

using a data transformation to change a data representation of first and second data in a first form into third and fourth data in a second form while maintaining their number of bits unchanged, one of said first form and said second form representing a signed format and another representing an unsigned format, wherein each of said third and fourth data includes data bits from both of said first and second data; and performing an operation on said third and fourth data by using an instruction that is designated to perform said operation on data only in said second form so as to effect said operation on said first and second data without an instruction designated for operating on data in said first form.

2. A method as in claim 1, wherein:

said first form is in said signed format and said second form is in said unsigned format;

said operation includes a subtraction between two signed numbers having the same number of significant bits; and said data transformation comprises exchanging the most significant bits of said two signed numbers to generate two new signed numbers and then removing the sign bits from each new signed numbers to generate two unsigned numbers.

3. A method for operating a data processor, comprising:

exchanging the most significant bits while maintaining other bits of first and second signed data to produce third and fourth signed data each having a same number of bits as said first and second signed data and having bits from both of first and second signed data;

forming a first unsigned data with said third signed data and a second unsigned data with said fourth signed data by eliminating the sign bit in each of said third and fourth signed data; and performing an unsigned subtraction between said first unsigned data and said second unsigned data to effect a signed subtraction operation between said first and second signed data without an instruction for said signed substraction.

4. A method for operating a data processor, comprising:

separating the most significant bit from other bits of each of first and second signed data;

combining the most significant bit of said first signed data to the other bits of said second signed data and removing a sign bit to produce a first unsigned data;

combining the most significant bit of said second signed data to the other bits of said first signed data and removing a sign bit to produce a second unsigned data, said first and second unsigned data having a same number of bits as said first and second signed data, wherein a selected operation on first and second signed data requires a signed instruction designed for operating on signed data; and applying a selected unsigned instruction on said first and second unsigned data so as to effect said selected operation on said first and second signed data by said signed instruction without requiring said signed instruction in the microprocessor.

5. A method as in claim 4, wherein said selected operation includes a subtraction between two signed numbers having the same number of significant bits and said substraction of said two signed numbers is performed by a substraction between two unsigned numbers generated from said two signed numbers.

* * * * *